United States Patent [19]

Matsumoto et al.

[11] Patent Number: 4,551,518

[45] Date of Patent: Nov. 5, 1985

[54] PROCESS FOR PRODUCTION OF POLYURETHANE

[75] Inventors: Mitsuo Matsumoto; Koji Hirai; Noriaki Yoshimura, all of Kurashiki; Takayuki Okamura, Okayama, all of Japan

[73] Assignee: Kuraray Co., Ltd., Okayama, Japan

[21] Appl. No.: 632,921

[22] Filed: Jul. 20, 1984

[30] Foreign Application Priority Data

Jul. 21, 1983 [JP] Japan ................................ 58-134100
Dec. 5, 1983 [JP] Japan ................................ 58-230396
Mar. 19, 1984 [JP] Japan ................................ 59-52828

[51] Int. Cl.$^4$ ..................... C08G 18/42; C08G 18/08
[52] U.S. Cl. ....................................... 528/80; 528/65; 528/84
[58] Field of Search ............................ 528/65, 80, 84

[56] References Cited

U.S. PATENT DOCUMENTS

| | | | |
|---|---|---|---|
| 3,428,725 | 2/1969 | Delmonte et al. | 528/65 |
| 3,591,561 | 7/1971 | Kazama et al. | 260/77.5 |
| 3,775,354 | 11/1973 | Hostettler et al. | 260/205 AN |
| 3,778,390 | 12/1973 | Ulrich | 260/2.5 |
| 3,798,198 | 3/1974 | Hole | 260/45.85 R |
| 4,051,111 | 9/1977 | Holloway | 528/80 |
| 4,086,214 | 4/1978 | Cardy | 528/80 |

*Primary Examiner*—Herbert S. Cockeram

[57] ABSTRACT

A novel process for production of polyurethane having excellent hydrolysis resistance, heat resistance, low-temperature characteristics and no tendency of crystallization and capability of making high solid content solution, which is obtained from a polymerized polyol having two or more hydroxy groups in the molecule and a polyisocyanate, and optionally a chain extender, characterized in that the polymerized polyol component is a polymerized polyol having

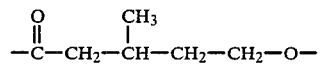

groups in the molecule.

5 Claims, No Drawings

PROCESS FOR PRODUCTION OF POLYURETHANE

The present invention relates to an improved process for production of polyurethane. More particularly, it relates to a process for production of polyurethane having excellent hydrolysis resistance, heat resistance, low temperature resistance, and no tendency of crystallization. It also relates to a process for production of a curable polyurethane for elastic materials which is capable of making a solution having a high solids content and has excellent processability and hydrolysis resistance.

It is well known to produce a polyurethane by reacting a polymerized polyol such as polyester polyol, polyether polyol and the like and a polyisocyanate, and optionally with a low molecular weight compound having active hydrogen atoms. Among these, a polyurethane which is produced by using as a polyol component a polyester polyol is inferior in hydrolysis resistance so that the surface of the polyurethane becomes adhesive in short term or has cracks, and hence, use of the polyurethane is limited. The polyurethane produced by using a polyether polyol instead of a polyester polyol has sufficient hydrolysis resistance, but has very low light resistance and has drawbacks in dynamic characteristics, friction resistance, oil resistance and solvent resistance. The polyurethane produced by using as a polymerized polyol component a polycarbonate polyol having good hydrolysis resistance such as 1,6-hexanediol polycarbonate can improve the above drawbacks of the polyurethane produced by using a polyether polyol; however, the polycarbonate polyol is very expensive and gives a polyurethane which still has drawbacks in cold resistance.

On the other hand, a conventional polyurethane having relatively good hydrolysis resistance is produced by using a polycaprolactone polyol and a polyester polyol obtained by reacting 1,6-hexanediol and neopentyl glycol with adipic acid. Such a polyurethane also does not have sufficiently improved hydrolysis resistance.

Further, a curable polyurethane is generally produced by curing a prepolymer (main agent) having terminal isocyanate groups or terminal hydroxy groups with a curing agent such as polyol, polyamine, water, polyisocyanate, or the like. Although a soft segment constituting the above agent may include polyether polyol, polyester polyol and the like, use of a polyester polyol generally makes a polyurethane superior in characteristics thereof as a coating and an elastic material and in adhesive properties. However, in comparison with the polyether polyol having the same molecular weight, the polyester polyol is a liquid having higher viscosity or a solid because of its crystallizability and hydrogen bond. Therefore, where non-solvent or high solid content is convenient as in paints, adhesives and the like or as in sealers, a polyether polyol is preferably used because a composition being liquid and having a lower viscosity has superior processability and is convenient for addition of filler, pigment and the like. Although the decrease in the molecular weight of a prepolymer can make a solid content of a polyester polyol prepolymer higher, it leads to lowering of characteristics of coating and adhesive properties.

The present inventors have intensively studied in order to obtain an improved process for producing a polyurethane which is inexpensive and has all desired characteristics such as excellent hydrolysis resistance, light resistance, dynamic characteristics, oil resistance, friction resistance, cold resistance and the like. As the result, it has been found that the above object can be achieved by using as a polyol component, a polyol having

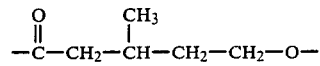

groups in the molecule.

Examples of the polyol having

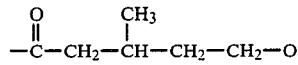

groups in the molecule include poly($\beta$-methyl-$\delta$-valerolactone)polyol, polyol mixture including it and a block or random copolymerized polyol obtained by ring opening copolymerization of $\beta$-methyl-$\delta$-valerolactone as one component. Poly($\beta$-methyl-$\delta$-valerolactone)polyol can be obtained by subjecting $\beta$-methyl-$\delta$-valerolactone to ring opening polymerization with a polyhydric alcohol having low molecular weight such as ethylene glycol, butanediol and the like.

It has also been found that further improved heat resistance can be obtained by using a process for producing a polyurethane produced from a polymerized polyol having two or more hydroxy groups in the molecule with a polyisocyanate and optionally with a chain extender, characterized in that the polymerized polyol component is a polymerized polyol obtained by subjecting a $\beta$-methyl-$\delta$-valerolactone to ring opening polymerization reaction with a compound having two or more active hydrogen atoms, and then, admixing a $\epsilon$-caprolactone to allow reaction.

The poly($\beta$-methyl-$\delta$-valerolactone)polyol itself is inferior in heat resistance, that is, a rapid depolymerization to $\beta$-methyl-$\delta$-valerolactone monomer takes place on leaving the polymerized polyol at a temperature of 120° C. At high temperature, such depolymerization still takes place, for example, even when poly($\beta$-methyl-$\delta$-valerolactone)polyol is modified by further reacting terminal hydroxy groups in the molecule of poly($\beta$-methyl-$\delta$-valerolactone)polyol with $\epsilon$-caprolactone.

However, we have surprisingly discovered that, when such modified poly($\beta$-methyl-$\delta$-valerolactone)polyol is used in the production of a polyurethane, the heat degradation in the polyurethane produced by using poly($\beta$-methyl-$\delta$-valerolactone)polyol which is not modified as described above.

The process of the present invention provides a polyurethane having an excellent characteristics which is produced by reacting a specific polymerized polyol and a polyisocyanate. The polyurethane thus obtained shows excellent characteristics, and hence, can be used for various utilities.

It is, therefore, an object of the present invention to provide a process for producing an improved polyurethane having excellent hydrolysis resistance. Another object of the present invention is to provide an improvement of properties of polyurethanes by incorporating $\epsilon$-caprolactone with a ring opening polymerization reaction mixture. A further object of the present invention is to provide a process for production of a curable polyurethane which is cured and molded simultaneously by reacting a polyfunctional isocyanate prepolymer with a compound having plural active hydrogen atoms. These and other objects as well as advantages of the present invention will be apparent to skilled persons in the art from the following description.

In accordance with the present invention, there is provided a process for production of a polyurethane having excellent hydrolysis resistance which is produced from a polymerized polyol having two or more hydroxy groups in the molecule with a polyisocyanate, and optionally with a chain extender, characterized in that the polymerized polyol component is a polymerized polyol having

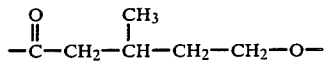

groups in the molecule.

In accordance with the present invention, there is also provided a process for production of a polyurethane which is produced from a polymerized polyol modified with ε-caprolactone, preferably having an average molecular weight of 300 to 10,000.

The above low molecular weight compound used in the polymerization of polyol includes low molecular weight polyols such as ethylene glycol, butanediol, 3-methyl-1,5-pentane-diol, trimethylolpropane, glycerol; low molecular weight polyamines such as ethylenediamine, hexamethylenediamine; low molecular weight alkanolamine such as ethanolamine, or the like.

A poly(ε-caprolactone)polyol obtained in the same manner as described above as well as a polyester polyol obtained by condensation polymerization of a diol and a dicarboxylic acid usually show high melting points of 30° to 60° C. and high tendency of crystallization, and hence, polyurethanes obtained from such polyols produce crystalline curing of soft segment components to damage elasticity readily. Moreover, such polyols have high melting viscosities to interfere with handling in preparation of polyurethanes. On the other hand, poly(β-methyl-δ-valerolactine)polyol itself is an amorphous polymer and a liquid having very low viscosity so that it has no such defect.

Although methyl-δ-valerolactones include β-methyl-δ-valerolactone, β-methyl-δ-valerolactone, γ-methyl-δ-valerolactone and δ-methyl-δ-valerolactone, only a polyurethane composed of a polymer or copolymer obtained by ring opening polymerization of β-methyl-δ-valerolactone as the soft segment component thereof has an excellent hydrolysis resistance. A polyurethane composed of a polymer obtained by ring opening polymerization of another methyl-δ-valerolactone(α-, γ- or δ-methyl-δ-valerolactone) or δ-valerolactone substituted with no methyl group as the soft segment component does not have sufficient hydrolysis resistance as in a polyester polyurethane other than the polyurethane in the present invention. A polyurethane composed of a polymer obtained by ring opening polymerization of dimethyl-δ-valerolactone does not have good tensile strength and elongation. Poly-ε-caprolactone polyurethane does not have sufficient improved hydrolysis resistance, either.

Furthermore, among the poly(methyl-δ-valerolactone)polyurethanes, only poly(β-methyl-δ-valerolactone)-polyurethane or the polyurethane composed of a polymer or copolymer obtained by ring opening polymerization of β-methyl-δ-valerolactone has remarkable excellent light resistance. Such polyurethane is not inferior to a conventional polyester polyurethane in friction resistance, oil resistance, cold resistance and other mechanical characteristics. Therefore, in the present invention, it is essential for hydrolysis resistance that the δ-valerolactone used for producing a polymerized polyol has only one methyl substituent at the β-position.

In the present invention, when the amount of the group produced by ring opening polymerization of β-methyl-δ-valerolactone (i.e.

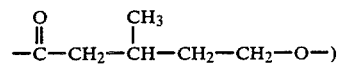

is not less than 20% by weight, preferably not less than 40% by weight based on the entire polymerized polyol, there can be obtained excellent characteristics in hydrolysis resistance and lower viscosity of a prepolymer. It is most preferable that the polymerized polyol be composed of only

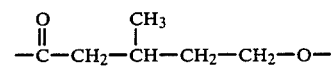

group except

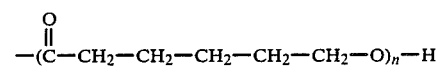

at the both terminal groups in the polymerized polyol and the group based on the low molecular weight compound which is employed as an initiater of ring opening polymerization of β-methyl-δ-valerolactone. Namely, when β-methyl-δ-valerolactone is used alone, or when all of the polyol is poly(β-methyl-δ-valerolactone)-polyol, there can be obtained the most excellent hydrolysis resistance and low viscosity of the prepolymer.

The replacement of not less than 20% by weight, preferably not less than 40% by weight of polybutylene adipate polyol or polyhexamethylene adipate polyol with the present modified polymerized polyol provides a polyurethane having an improved hydrolysis resistance and reduced crystallinity, whereby polyurethane having improved low temperature characteristics and elasticity can be obtained.

The improved characteristics described above can be obtained by a content of not less than 20% by weight, preferably not less than 40% by weight of

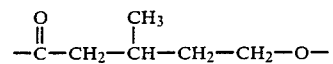

group in the polyol component, even when polyurethane is composed of the copolymer with the other lactones, for example, the polymerized polyol having

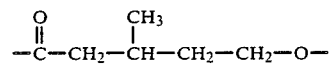

groups in random or block state in the molecule which is produced by ring opening copolymerization of ε-caprolactone and β-methyl-δ-valerolactone or the block polymerized polyol obtained from adipate polyester polyol and β-methyl-δ-valerolactone.

The polymerized polyol used in the present invention is produced, for example, as follows.

In the first step, β-methyl-δ-valerolactone is subjected to ring opening addition polymerization with a compound having two or more active hydrogen atoms. Usually, the reaction is carried out in the presence of a catalyst. The catalyst used in the present invention includes any conventional catalyst used in the ring opening polymerization of lactone such as mineral acid (e.g. sulfuric acid, phosphoric acid), alkali metal (e.g. lithium, sodium, potassium), metal alkyl compound (e.g. n-butyl lithium), or the like. In general, the catalyst is preferably used in an amount of 0.001 to 10% by mole based on the lactone. The reaction is carried out in an atmosphere of inert gas such as nitrogen, helium, argon, or the like. It is preferable to reduce the water content of β-methyl-δ-valerolactone and the above low molecular compound as much as possible before the reaction. The reaction may be usually carried out at the temperature of not less than 0° C., and preferably is carried out at the temperature of not more than 120° C. because of insufficient heat stability of poly(β-methyl-δ-valerolactone). The reaction time is usually selected from within the range of 10 minutes to 50 hours. The reaction may be usually carried out in the absence of a solvent, and also may be carried out in the presence of solvent inert to the reaction. After the reaction is almost completed, the desired amount of ε-caprolactone is incorporated with the mixture, and a further reaction is continued, by which the terminal groups of poly(β-methyl-δ-valerolactone)polyol (referred to P-B-MVL) is modified with ε-caprolactone to as give the polymerized polyol used in the present invention. By increasing the amount of modification of ε-caprolactone, there can be naturally obtained a polyurethane having more improved heat resistance, but lower hydrolysis resistance. Accordingly, in the reaction for modification of the polymerized polyol, it is preferable to use the β-methyl-δ-valerolactone/ε-caprolactone in a ratio of 1/0.1 to 1/5 by mole, more preferably 1/0.2 to ½ by mole.

The heat stability of the polyester polyol used in the present invention may be deteriorated by a certain catalyst used in the preparation of P-B-MVL, or the presence of such catalyst may induce undesirable side-reaction in the production of polyurethane, and hence, it is preferable that the resulting modified polyester polyol be washed with water to remove the catalytic substance.

The polymerized polyol used in the present invention has usually a molecular weight of 300 to 10,000 preferably 600 to 6,000, more preferably 700 to 4,000.

A polyol used in combination with the polyol having

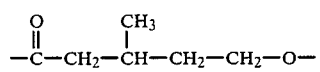

groups may be any polyol which is used in conventional production of a polyurethane.

The organic polyisocyanate used in the present invention includes aromatic diisocyanates such as 4,4'-diphenylmethane diisocyanate, 2,4-tolylene diisocyanate, 2,6-tolylene diisocyanate, phenylene diisocyanate, 1,5-naphtylene diisocyanate, 3,3'-dichloro-4,4'-diphenylmethane diisocyanate, xylylene diisocyanate, tolylene diisocyante and the like; and aliphatic or alicyclic diisocyanates such as hexamethylene diisocyanate, isophorone diisocyanate, 4,4'-dicyclohexylmethane diisocyanate, hydrogenated xylylene diisocyanate, hydrogenated phenylene diisocyanate and the like. The polyisocyanate can be used alone or in combination of two or more thereof. Furthermore, these organic polyisocyanates can be used by converting to a polyfunctional isocyanate prepolymer via reacting such organic isocyanate with polyfunctional diols such as trimethylol propane, glycerol, pentaerythritol and the like, or by converting prepolymer having isocyanate terminal groups (main agent).

In the conventional method for producing a polyurethane, a low molecular compound having two or more active hydrogen atoms is used as a chain extender (curing agent) and in the present invention, such a compound can be also used.

Typical examples of the compound having active hydrogen atoms are diols such as ethylene glycol, 1,4-butane diol, propylene glycol, 1,6-hexanediol, 1,4-bis(β-hydroxyethoxy)benzene, 1,4-cyclohexanediol, bis(β-hydroxyethyl)telephtharate, xylene glycol; water, hydrazine, ethylenediamine, propylenediamine, xylylenediamine, isophoronediamine, piperazine, phenylenediamine, tolylenediamine, dihydrazide adipate, dihydrazide isophtharate, and the like. Such an extender may be used alone or in combination thereof. If desired, a monohydric alcohol having low molecular weight, an amine having low molecular weight and the like may be incorporated as a modifier.

In regard to the step for producing a polyurethane, the present invention can employ any conventional method. For example, the step for producing a polyurethane can be carried out by mixing a polymerized polyol with a low molecular weight compound having active hydrogen atoms and preheating at about 40° to 100° C., then, incorporating a polyisocyanate compound with the admixture and stirring vigorously for a short term and allowing to stand at about 50° to 150° C. The polyisocyanate compound is incorporated with the mixture with the ratio of the number of active hydrogen atoms in the mixture/number of NCO groups of about 1/1. Alternatively, the reaction may be carried out via a polyurethane prepolymer. The polyisocyanate compound is usually used in slight excess because of sensitivity thereof to a moisture.

The reaction may be carried out in one or more solvents selected from the group consisting of dimethylformamide, diethylformamide, dimethylsulfoxyde, dimethylacetoamide, tetrahydrofuran, isopropanol, benzene, toluene, ethyl cellosolve, trichloroethylene and the like. For the purpose of obtaining a high molecular weight polyisocyanate, it is preferable that the concentration of the solution is 10 to 40% by weight.

The polyurethane obtained by the process of the present invention has remarkably excellent hydrolysis resistance, and hence, it can be used for various applications.

Examples of the process for production and the application of the polyurethane produced in the present invention are as follows:

(1) Making substantially liner thermoplastic polyurethane pellets, heating and melting the pellets and producing a elastomeric product from the resulting molten material by injection molding, extrusion molding, calendering and the like.

(2) Mixing a polymerized polyol, an organic polyisocyanate and an chain extender together therewith, or making a prepolymer having isocyanate or hydroxy groups as terminal groups by reacting a polymerized polyol with an organic polyisocyanate before incorporating a chain extender or a polyisocyanate with the resultant mixture to use for particular applications such as casting elastomers, paints, adhesives and the like.

(3) Mixing a main agent with a curing agent and forming a coating and moldings under conditions being capable of effecting curing and molding simultaneously. The polyurethane can be produced, for example, by mixing a main agent with an chain extender mechanically at room temperature to 130° C., if desired, deaerating before curing and molding via casting, coating, molding and the like. The ratio of the above main agent/curing agent may be varied depending on its particular use. Generally, it is preferable for their characteristics to use (the number of group of NCO groups in main agent and curing agent)/(the number of active hydrogen atoms) within the ratio range of 0.8/1 to 3.0/1. But, the production of the polyurethane can be carried out at outside of the above ratio range.

(4) Dissolving the polyurethane obtained by solution polymerization or bulk polymerization into a solvent to use as coating agents, an impregnant and a regulating agent of hand and feel for synthetic leathers, artificial leathers and the like.

(5) Dissolving the prepolymer having terminal isocyanate groups into a solvent, adding a chain extender, etc. to the solution to prepare a stable spinning dope and making elastic fiber through wet spinning or dry spinning.

(6) Adding various additives such as a blowing agent and so forth with a polymerized polyol, and incorporating an organic polyisocyanate or a prepolymer having terminal isocyanate groups to the mixture, or adding the above additives to a mixture of a main agent and a curing agent, and then, stirring at a high speed to obtain a polyester polyurethane having fusing characteristics, foam rubber, microcellular and the like.

Examples of further use of the polyurethane produced in the present invention are sheets, films, rollers, gears, solid tires, belts, hoses, tubes, insulations to vibration, packing materials, shoe soles (e.g. microcellular), artificial leathers, fiber processing agents, cushioning mediums, mechanical parts, paints, adhesives, sealers, waterproofing agents, floor coverings, elastic fibers, caulking materials, casting elastomers, foam rubbers, other various kinds of curable polyurethanes having pigment, dye stuff and other additives, and so on.

The present invention is illustrated by the following Examples but should not be construed to be limited thereto. In the Examples, the various properties of polyurethane were measured by the following methods.

(1) Hydrolysis resistance (A) A polyurethane film having a thickness of 60μ was subjected to an accelerated hydrolysis test in hot water at 100° C. for one week, and then, the remaining film was dissolved in DMF. The retaining ratio of logarithmic viscosity number (the ratio of logarithmic viscosity in DMF before and after the test) was measured.

(B) A polyurethane film having a thickness of 50μ was subjected to a jungle test at 70° C. in relative humidity of 95% for 28 or 45 days. The retaining fraction of tensile strength (tensile strength of polyurethane film after test/tensile strength of polyurethane film before test) was measured.

(2) Light resistance

A polyurethane film (thickness: 50μ) was tested with a sunshine weather-o-meter (illuminant: carbon-arc) at an atmosphere of 63° C. for 50 hours. The retaining ratio of tensile strength was measured.

(3) Solvent resistance

A polyurethane film having thickness of 200μ was dipped into toluene or ethyl acetate at 30° C. for one night, and then, the swelling in weight of the test film was measured.

(4) Low-temperature characteristics (a) Cold resistance

A test piece having a thickness of 0.2 mm was prepared, and then, a glass transition point (Tg) was measured with direct-reading dynamic viscoelasticity meter (110 Hz Vibron Model DDV-II, manufactured by Toyo Sokki Co., Ltd., Japan).

(b) Flexing resistance

A polyurethane solution was coated onto an artificial leather substrate and dried so as to provide the dry thickness of 20μ. Flexibility resistance was measured with flexing machine (stroke width: maximum 3 cm, minimum 1 cm) having flexing pitch of 8,600 cycles/hour at a temperature of −20° C. Symbol o shows no change, symbol Δ shows slight damage and symbol x shows the presence of a damage such that a substrate appears.

(5) Wearing properties

A test film (thickness: 1 mm) was rubbed with a tapered wear tester (H-22, load: 1,000 g, 1,000 cycles), and then, the reduced weight of the test film was measured.

(6) Heat resistance

A sample (10 mg) was subjected at a constant temperature of 210° C. in an atmosphere of nitrogen for five hours, after which a thermogravimetric reducing factor was measured by differential scanning calorimeter TG-DSC (manufactured by Rigaku Denki Co., Ltd., Japan).

In Examples, polyols, polyisocyanates and chain extenders of the raw material of a polyurethane are referred to by the following shorthand.

| Shortening | Compound |
|---|---|
| P-β-MVL | Poly(β-methyl-δ-valerolactone)glycol (initiater: ethylene glycol) |
| PCL | Polycaprolactone glycol (initiater: ethylene glycol) |
| PBA | Polybuthyleneadipate glycol |
| PEA | Polyethyleneadipate glycol |
| p-β-MVL/PCL = 70/30 | Polymerized diol obtained by stepwise addition of poly-(β-methyl-δ-valerolactone)glycol and ε-caprolactone (weight ratio of 70/30, initiator: ethylene glycol) |
| P-β-MVL/PCL = 50/50 | Polymerized diol obtained by stepwise addition of β-methyl-δ-valerolactone and ε-caprolactone (weight ratio of 50/50, initiater: ethylene glycol) |
| PCL/p-β-MVL = 50/50 | Random copolymerized polymerdiol by simultaneous addition of β-methy-δ-valerolactone and ε-caprolactone (weight ratio of 50/50, initiater: ethylene glycol) |
| P-γ-MVL | Poly(γ-methyl-δ-valerolactone)glycol |
| P-α-MVL | Poly(α-methyl-δ-valerolactone)glycol |
| P-D-MVL | Poly(γ,γ-dimethyl-δ-valerolactone)-glycol |
| TDI | Tolylene diisocyanate mixture (2,4-compound 80%, 2,6-compound 20%) |
| MDI | 4,4'-Diphenylmethane diisocyanate |
| HDI | Hexamethylene diisocyanate |
| EG | Ethylene glycol |
| BD | 1,4-Butanediol |
| BHEB | 1,4-bis(β-hydroxyethoxy)benzene |
| TMP | Trimethylol propane |

-continued

| Shortening | Compound |
|---|---|
| Colonate L | Adduct of TMP (1 mole) and TDI (3 moles) |
| Colonate HL | Adduct of TMP (1 mole) and HDI (3 moles) |
| TMP(p-β-MVL)₃ | Trifunctional prepolymer having terminal OH groups obtained by ring open polymerization of β-MVL (initiater: TMP) |
| TMP(p-β-MVL)₃(TDI) | Trifunctional prepolymer having terminal NCO groups obtained by reacting TMP(p-β-MVL)₃ (1 mole) with TDI (3 moles) |
| (P-β-MVL)ₓ(TDI)ᵧ | Polyurethane (molecular weight 50,000) having OH at the both terminals obtained by reacting p-β-MVL (X moles) with TDI (y moles) |

Preparation

A separable flask (300 ml) with a stirrer, a dropping funnel and an inlet and an outlet for gas was replaced completely with dry nitrogen gas. Then, into the flask ethylene glycol (4.3 g) and butyl lithium (0.09 g) were charged and stirred while maintaining the bath temperature of 40° C., after which β-methyl-δ-valerolactone (105 g) was added from the dropping funnel at once with vigorous stirring. The viscosity of the mixture was raised immediately. After two hours, ε-caprolactone (45 g) was added, and the reaction was continued. The stirring was stopped after one hour, and the content of flask was taken out, dissolved with purified chloroform (600 ml) at the room temperature and washed with distilled water (600 ml×3) at the room temperature. Then, the chloroform and water were completely removed. The resultant polyesterpolyol has a molecular weight of 2,300 and was liquid.

EXAMPLES 1 TO 12, REFERENCE EXAMPLES 1 TO 10

By using of raw materials in Table 1, polyurethanes were prepared as follows. A predetermined amount of a polyol and polyisocyanate were reacted in an atmosphere of nitrogen. The resultant prepolymer was dissolved in dimethylformamide (referred to DMF) to give the solution having a concentration of 25% by weight. Then, the desired amount of chain extender was dissolved into DMF, and the solution was added to the latter prepolymer solution and reacted at 70° C. for 10 hours with stirring to give a solution of polyurethane in DMF.

The above polyurethane solution was adjusted to a concentration of 10% by weight, and hence, the resultant solution was cast onto glass and dried to give dry film having a thickness of 50μ and 200μ. The dry film thus obtained was supplied to the above mentioned various characteristics tests. These results are shown in Tables 2(A) and 2(B).

TABLE 1

|  | Polymerized Polyol (average molecular weight [mole ratio] | Poly-isocyanate [mole ratio] | Chain extender [mole ratio] |
|---|---|---|---|
| Ex. 1 | P-β-MVL (2000) [1.0] | MDI [5.0] | BD [4.0] |
| Ref. Ex. 1 | PCL (2000) [1.0] | " | " |
| Ref. Ex. 2 | PBA (2000) [1.0] | " | " |
| Ref. Ex. 3 | PEA (2000) [1.0] | " | " |
| Ex. 2 | P-β-MVL (2000) [0.5] PCL (2000) [0.5] | " | " |
| Ex. 3 | P-β-MVL (4000) [1.0] | MDI [3.0] | EG [2.0] |
| Ref. Ex. 4 | PCL (4000) [1.0] | " | " |
| Ex. 4 | P-β-MVL (2000) [1.0] | TDI [3.0] | BHEB [2.0] |
| Ref. Ex. 5 | P-α-MVL (2000) [1.0] | MDI [5.0] | BD [4.0] |
| Ref. Ex. 6 | P-D-MVL (2000) [1.0] | " | " |
| Ref. Ex. 7 | P-γ-MVL (2000) [1.0] | " | " |
| Ex. 5 | P-β-MVL/PCL = 70/30 (3000) [1.0] | MDI [6.0] | BD [5.0] |
| Ex. 6 | P-β-MVL/PCL = 50/50 (3000) [1.0] | " | " |
| Ex. 7 | P-β-MVL/PCL = 70/30 (2000) [1.0] | MDI [4.0] | BD [3.0] |
| Ex. 8 | P-β-MVL/PCL = 50/50 (2000) [1.0] | " | " |
| Ex. 9 | P-β-MVL (3000) [1.0] | MDI [6.0] | BD [5.0] |
| Ex. 10 | PCL/P-β-MVL = 50/50 (3000) [1.0] | " | " |
| Ref. Ex. 8 | PCL (3000) [1.0] | " | " |
| Ref. Ex. 9 | PBA (3000) [1.0] | " | " |
| Ref. Ex. 10 | PEA (3000) [1.0] | " | " |
| Ex. 11 | P-β-MVL/PCL = 40/60 (2000) [1.0] | TDI [4.0] | BHEB [3.0] |
| Ex. 12 | P-β-MVL/PCL = 60/40 (2000) [1.0] | " | " |

TABLE 2

|  | Hydrolysis resistance (B) Retaining ratio of strength (%) | Light resistance Retaining ratio of strength (%) | Solvent resistance Degree of swelling | | Low-temperature characteristics Tg (°C.) | Tapered wearing (mg) | Properties of dry film | |
|---|---|---|---|---|---|---|---|---|
|  |  |  | Toluene | Ethyl acetate |  |  | Tensile strength (kg/cm²) | Elongation (%) |
| Ex. 1 | 80 | 60 | 1.27 | 1.39 | −17 | 25 | 740 | 420 |
| Ref. Ex. 1 | 34 | 42 | 1.36 | 1.40 | −25 | 20 | 760 | 460 |
| Ref. Ex. 2 | 21 | 42 | 1.26 | 1.42 | −22 | 21 | 780 | 440 |
| Ref. Ex. 3 | 12 | 39 | 1.30 | 1.40 | −15 | 26 | 790 | 440 |
| Ex. 2 | 55 | 58 | 1.29 | 1.39 | −23 | 22 | 780 | 440 |
| Ex. 3 | 75 | 57 | 1.78 | 2.01 | −22 | 45 | 780 | 495 |
| Ref. Ex. 4 | 24 | 30 | 1.89 | 2.22 | −26 | 42 | crystalline curing (while film) | |
| Ex. 4 | 80 | 68 | 1.48 | 1.85 | −20 | 43 | 750 | 460 |
| Ref. Ex. 5 | 36 | — | — | — | good | — | — | — |
| Ref. Ex. 6 | 83 | — | — | — | bad | — | — | — |
| Ref. Ex. 7 | 34 | — | — | — | good | — | — | — |

|  | Hydrolysis resistance (A) Retaining ratio of logarithmic viscosity (%) | Heat resistance Thermogravimetric reducing factor (%) | Low-temperature characteristics | | Tapered wearing (mg) |
|---|---|---|---|---|---|
|  |  |  | Tg (°C.) | Flexibility resistance |  |
| Ex. 5 | 80 | 5 | −25 | o | 20 |
| Ex. 6 | 65 | 3 | −27 | o | 18 |
| Ex. 7 | 79 | 3 | −24 | o | 22 |
| Ex. 8 | 63 | 1 | −26 | o | 20 |

TABLE 2-continued

| | | | | | |
|---|---|---|---|---|---|
| Ex. 9 | 89 | 48 | −21 | Δ/o | 25 |
| Ex. 10 | 62 | 27 | −25 | o | 20 |
| Ref. Ex. 8 | 28 | 3 | −26 | o | 18 |
| Ref. Ex. 9 | 20 | 5 | −22 | Δ | 23 |
| Ref. Ex. 10 | 7 | 25 | −15 | Δ | 26 |
| Ex. 11 | 50 | 1 | −26 | o | 19 |
| Ex. 12 | 61 | 3 | −24 | o | 21 |

EXAMPLE 13

β-Methyl-δ-valerolactone (referred to β-MVL) was subjected to ring opening polymerization as an initiator TMP to give TMP(p-β-MVL)₃ (molecular weight: 3,000) having a low viscosity. The TMP(p-β-MVL)₃ (1 mole) was reacted with TDI (3 moles) to give a tri-functional prepolymer having terminal isocyanate groups. The prepolymer was liquid, and hence, it had not only good processability but also has capability no requirement for a solvent as it is using for the raw materials of a moisture curable polyurethane and a two-liquid type curable polyurethane which were reacted with low molecular glycols, aromatic diamines and so forth. The resultant prepolymer was cured with BD and water respectively in the absence of solvent. The hydrolysis resistance of the resultant polyurethane is shown in Table 3. In the same manner as described above, ε-caprolactone (ε-CL) was used instead of β-MVL. These results are also shown in Table 3.

TABLE 3

| Prepolymer having terminal NCO groups | Curing agent | Solvent | Hydrolysis resistance (B) (%) |
|---|---|---|---|
| TMP(p-β-MVL)₃(TDI)₃ liquid | BD | non | 90 |
| TMP(p-β-MVL)₃(TDI)₃ liquid | water | non | 92 |
| TMP(p-ε-CL)₃(TDI)₃ | BD | Ethyl acetate | 20 |
| TMP(p-ε-CL)₃(TDI)₃ | water | Ethyl acetate | 18 |

The admixing of a prepolymer having terminal NCO groups and a curing agent was carried out within the ratio of (the number of NCO groups)/(the number of active hydrogen atoms) of 1.1/1.

EXAMPLE 14

β-MVL was subjected to ring opening polymerization as an initiator ethylene glycol to give p-β-MVL having a molecular weight of 2,000 and TMP(p-β-MVL)₃ having molecular weight 4,000 as liquid. These prepolymers were reacted with Colonate L (75 weight % solid in ethyl acetate solution), Colonate HL (75 weight % solid in ethyl acetate solution) or TDI and cured simultaneously to give a polyurethane coat. The hydrolysis resistance of the resulting film was measured. The results are shown in Table 4.

TABLE 4

| Prepolymer having terminal OH groups (average molecular weight) | Curing agent | Hydrolysis resistance (%) |
|---|---|---|
| P-β-MVL (3,000) liquid | Colonate L | 85 |
| | Colonate HL | 92 |
| | TDI | 75 |
| TMP(p-β-MVL)₃(5,000) liquid | Colonate L | 90 |
| | Colonate HL | 92 |
| | TDI | 88 |
| (p-β-MVL)₁₂(TDI)₁₁(50,000) | Colonate L | 91 |
| | Colonate HL | 93 |
| | TDI | 88 |
| P-ε-CL (3,000) solid | Colonate L | 21 |
| | Colonate HL | 25 |
| | TDI | not more than 10 |
| TMP(p-ε-CL)₃(5,000) solid | Colonate L | 18 |
| | Colonate HL | 23 |

The admixing of a prepolymer having terminal OH groups and curing agents was carried out within the ratio of OH/NCO of 1/1.1.

What is claimed is:

1. A process for production of polyurethane having excellent hydrolysis resistance which is obtained from a polymerized polyol having two or more hydroxyl groups in the molecule and a polyisocyanate, and optionally a chain extender, characterized in that the polymerized polyol component is a polymerized polyol having

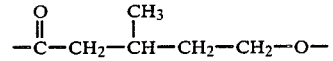

groups in the molecule, and the amount of the reactants is such that the ratio of the number of groups of NCO in the polyisocyanate to the number of active hydrogen atoms in the polymerized polyol and the chain extender ranges from 0.8/1 to 3.0/1.0.

2. A process according to claim 1, wherein the polymerized polyol component is a polymerized polyol which is obtained by subjecting a β-methyl-δ-valerolactone to ring opening polymerization reaction with a compound having two or more active hydrogen atoms, and adding and reacting epsilon-caprolactone to obtain the polymerized polyol having not less than 20% by weight of

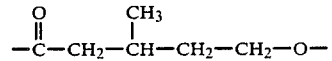

groups in the polyol.

3. A process according to claim 1, the amount of

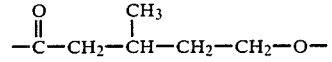

groups is not less than 40% by weight, based on the weight of the whole polymerized polyol.

4. A process according to claim 1, wherein the polymerized polyol has an average molecular weight of 300 to 10,000.

5. A process according to claim 1, wherein the polyurethane is obtained by casting the polyurethane as a liquid into a mold and allowing it to cure.

* * * * *